May 18, 1937.  W. L. MORRISON  2,080,431
AIR DEFLECTOR
Filed Aug. 31, 1932  2 Sheets-Sheet 2
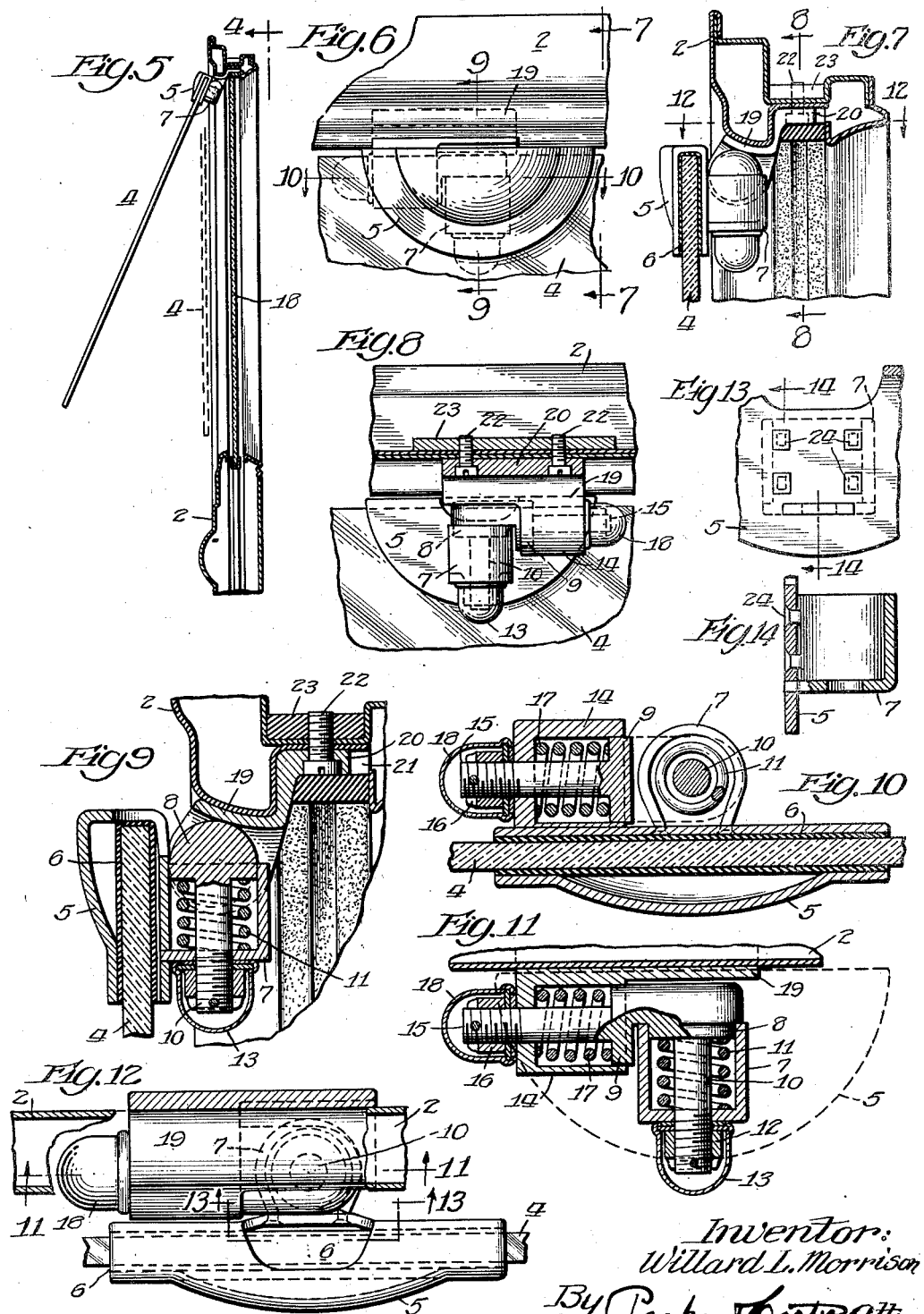
Inventor:
Willard L. Morrison
By Parker & Carter Attys.

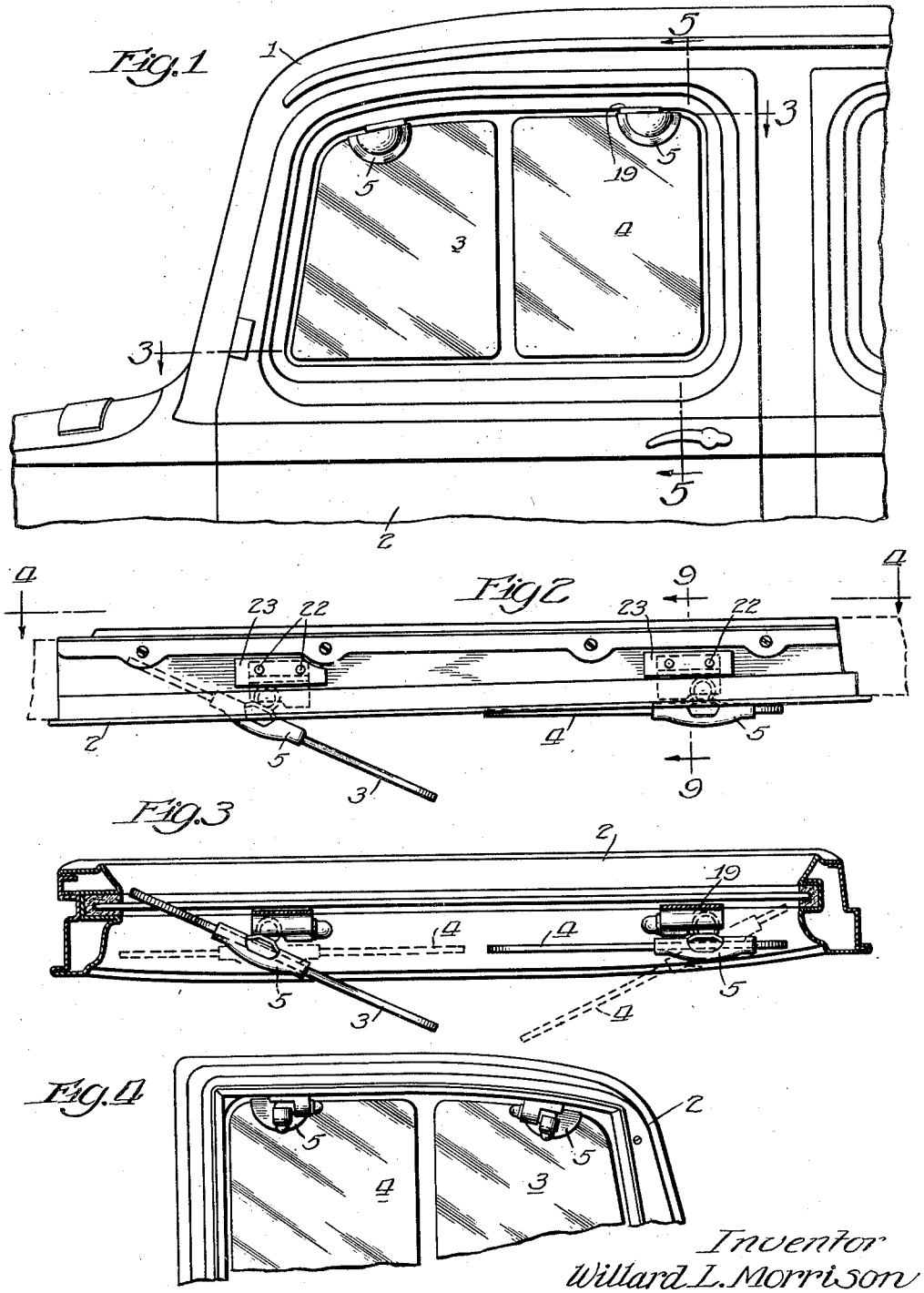

Patented May 18, 1937

2,080,431

UNITED STATES PATENT OFFICE 2,080,431

AIR DEFLECTOR

Willard L. Morrison, Chicago, Ill.

Application August 31, 1932, Serial No. 631,136

15 Claims. (Cl. 296—84)

This invention relates to air deflectors for automobiles and has for its object to provide a new and improved device of this description. The invention has as a further object to provide an air deflector for automobiles which is suspended at the upper edge only. The invention has as a further object to provide an air deflector which does not interfere with the resting of the elbow on the window reveal. The invention has as a further object to provide an air deflector which gives easy access to the opposed faces of the window and the deflector so that both may be easily cleaned. The invention has as a further object to provide an air deflector which can be moved to a great variety of angular positions. The invention has as a further object to provide an air deflector which gives complete control of draft deflection and of air scooping. The invention has further objects which are more particularly pointed out in the accompanying description.

Referring now to the drawings, Fig. 1 is a view of the upper portion of an automobile showing one form of my air deflector in position;

Fig. 2 is a top view of the door with the air deflector in position;

Fig. 3 is a sectional view taken on line 3—3 of Fig. 1;

Fig. 4 is an inside view showing the air deflector in position taken on line 4—4 of Fig. 2 with the window down;

Fig. 5 is a sectional view taken on line 5—5 of Fig. 1;

Fig. 6 is an enlarged fragmentary view of a portion of the deflector showing the fastening member therefor;

Fig. 7 is a sectional view taken on line 7—7 of Fig. 6;

Fig. 8 is a sectional view taken on line 8—8 of Fig. 7;

Fig. 9 is an enlarged sectional view taken on line 9—9 of Fig. 6;

Fig. 10 is a sectional view taken on line 10—10 of Fig. 6;

Fig. 11 is a sectional view taken on line 11—11 of Fig. 12;

Fig. 12 is a sectional view taken on line 12—12 of Fig. 7;

Fig. 13 is a sectional view taken on line 13—13 of Fig. 12;

Fig. 14 is a sectional view taken on line 14—14 of Fig. 13.

Like numerals refer to like parts throughout the several figures.

Referring now to the drawings, I have shown a portion 1 of the body of an automobile. The door 2 has the usual window opening therein and may have the usual window. Located in the window opening are two air deflectors, one at the front and the other at the rear. These air deflectors have the glass sheets 3 and 4. Both of these are supported only at their upper edges, all the other edges being free.

The supporting devices for the two glasses are of similar construction, and I have described in detail only one of these supporting devices, the one in connection with the glass 4. The supporting device consists of a clamping member 5 into which the upper edge of the glass 4 is received. The clamping member is preferably of metal, and there is a non-metallic piece 6 which fits around the upper edge of the glass inside of the clamping member. Connected with the clamping member and moving with it is a hollow part 7. Fitting into the hollow part 7 is a friction member 8 which is connected to a similar friction member 9 at substantially right angles thereto, which friction members are suitably supported on the reveal of window frame, as hereinafter set out. The friction member 8 has a reduced portion 10 which passes through an opening in the element 7, the outer end of which is threaded. A spring 11 surrounds this reduced portion and engages the hollow member 7. A nut 12 on the end of the reduced portion 10 may be tightened up to move the friction member 8 farther down into the hollow member 7 and compress the spring 11 so as to form a frictional engagement between the friction member 8 and the hollow member 7. A cover piece 13 may be placed over the nut 12.

The friction member 9, with which the friction member 8 is connected, is received in a hollow member 14, see Fig. 10, similar to the member 7, and has a reduced portion 15 which passes through the wall of the member 14 and has a threaded end. A nut 16 is provided on the threaded end of the reduced portion 15, which when tightened moves the friction member 9 farther down into the member 14 and compresses the spring 17 in the member 14 so as to produce a frictional resistance to relative movement of the frictional member 9 and the member 14. The nut may be provided with a cover 18. The member 14 is connected with the reveal or window engaging member 19 which engages the edge of the reveal or window frame, as shown in Fig. 9. The engaging member 19 has a part 20 which fits into a groove 21 in the window frame member.

Fastening devices 22 pass through the window frame member, as shown in Figs. 8 and 9, and engage a holding piece 23. The fastening members 22 are preferably in the form of screws with threaded ends which enter threaded holes in the holding piece 23. This construction tightly fastens the glass supporting device to the window frame. This construction requires only two holes and these holes do not show in the event the device is removed from the window.

The glass supporting device for the glass 3 is similar to that just described in connection with the glass 4, the parts being the same, and hence I have not described it in detail. The only difference in the two supporting devices is that they are, as it were reversed. The supporting device for the glass 4 has the friction member 8 toward the rear thereof, and the supporting device for the glass 3 has this friction member 8 at the front thereof. The reason for this reversal of the parts is so that the rear glass 4 may have its forward end moved outwardly a considerable distance without interference by the supporting member, as shown in dotted lines in Fig. 3, so that it may act as an air scooper. The front glass 3 ordinarily has its rear end moved outwardly, as shown in full lines in Fig. 3. If, for example, the glass 3 is in the position shown in dotted lines in Fig. 3, and the glass 4 is moved to the position shown in dotted lines in said figure, it will be seen that air will be scooped into the vehicle by the glass 4. There are of course numerous other relative positions of these glasses which permit the scooping of the air. It will also be seen that by making the supporting device for the glass as shown in connection with the glass 4, it is only necessary to make two types of the supporting device, for the type used in connection with glass 4 is the type that is used on the opposite side of the car, for when used on the opposite side of the car at the front, the friction member 8 will be toward the front in the same relative position as that shown in connection with the glass 3.

The hollow members 7 and 17 may be made in any desired form and may be integral with the parts that support them or separate therefrom. For manufacturing reasons I prefer to make them separate, and when made separate the edges thereof, which engage the members which support them, may have projections 24 which pass through openings in the supporting part and which may have their ends riveted, as shown, to hold the parts in position, see Figs. 13 and 14.

The clamping member 5 of each glass must hold the glass tight so that the vibrations of the car will not jar it loose or move it down. Any suitable means to produce this result may be used. I have found, for example, that by making the piece 6 of rubber and then wetting it and pressing the clamping piece on with a high pressure, even as high as one or two thousand pounds, the clamping device is securely clamped to the glass and that, particularly if the rubber dries, the clamping is so tight that there is no chance of the glass being jarred down or loosened by the jarrings produced by the travel of the car.

The device for connecting the glass to the window frame is a universal fitting, as it were, as it is adjustable to all cars having standard style of reveals. It will further be noted that when the glasses are moved outward to a position like that shown in Fig. 5 they act as rain sheds, as it were, for preventing the rain from coming into the car. This also permits the arm to be put out for signalling without the rain coming in the window. There are also no lower mouldings for the glass to obstruct the view, the glasses giving a clear, full view.

The use and operation of my invention are as follows:

The glass may be moved to various angular positions in a vertical plane, as shown in Figs. 2 and 3, by taking hold of the glass and pushing or pulling it to the desired position. The friction, due to the compression of the spring 11, between the parts 8 and 7 maintains the glass in any of the various positions in which it is placed. The bottom of the glasses may also be pulled outwardly to various positions, one of which is shown in full lines in Fig. 5. This gives access to the car window 18 so that its outer surface may be cleaned, and also gives access to the inner surfaces of the glasses 3 and 4 so that such surfaces may be easily cleaned. By moving the glass 3 outwardly, as shown in full lines in Fig. 3, and the glass 4 outwardly as shown in dotted lines therein, room is given on the window reveal for the elbow of the driver. This result may also be accomplished by simply pushing out the rear glass 4.

Difference in the cars, even when made with the same dies, often produces serious alignment problems for double hinged uniformity. This construction avoids any difficulty because of alignment differences and gives complete control of draft deflection or air scooping. It will further be seen that this construction permits a dual window, the elements thereof being hung from the top only. Fig. 2 shows the glass 3 swung into deflecting position and the glass 4 parallel with the ordinary sliding window 18a and the body, and this prevents any effect of side wind draft coming in behind the deflector.

For purposes of illustration I have shown one form of device embodying my invention, but it is of course evident that the parts may be varied in many particulars without departing from the spirit of the invention as embodied in the claims hereto appended. I therefore do not limit myself to the particular construction shown.

I claim:

1. An air deflector for a side window of vehicles comprising a plate of glass having an inclined front edge inclined rearwardly from the bottom to the top of said glass, a supporting device connected with said glass at the top and connected with the upper part of the window frame by a pivotal connection located near the front inclined edge of said glass, the glass being supported entirely by its upper edge so that when the rear of the glass is swung outwardly the upper corner formed by the said inclined front edge and the upper edge of said glass remains within the plane of the window opening.

2. An air deflector for a side window of vehicles comprising a plate of glass having an inclined front edge inclined rearwardly from the bottom to the top of said glass, a supporting device connected with said glass at the top and connected with the upper part of the window frame, the glass being supported entirely by its upper edge, said supporting device having a hinge to permit the glass to be moved to various angular positions said hinge being located near the upper end of the front inclined edge of said glass so that when the rear of the glass is swung outwardly the upper corner formed by the said inclined front edge and the upper edge of said glass remains within the plane of the window opening.

3. An air deflector for a side window of vehicles comprising a plate of glass, a supporting device connected with said glass at the top and connected with the upper part of the window frame, the glass being supported entirely by its upper edge, said supporting device having a double hinge, one hinge being at substantially right angles to the other the axes of rotation of said hinges being fixed with relation to each other, whereby the glass may be moved to various angular positions about one hinge, and the bottom of the glass may be moved toward and from the vehicle about the other hinge.

4. An air deflector for a side window of an automobile comprising two separate plates of glass, a separate supporting device for each plate of glass connected with the top thereof, the two supporting devices being separately connected with the upper portion of the window frame by a pivotal connection located between the center of the glass and one edge thereof, said supporting device being substantially in alignment along the upper portion of said window frame the glasses being supported entirely by their upper edges.

5. An air deflector for a side window of an automobile comprising two separate plates of glass, a separate supporting device for each plate of glass connected with the top thereof, the two supporting devices being separately connected with the upper portion of the window frame, by a pivotal connection located between the center of the glass and one edge thereof, said supporting device being substantially in alignment along the upper portion of said window frame, the adjacent edges of said plates of glass being laterally movable with relation to each other said glasses being supported entirely by their upper edges.

6. An air deflector for a side window of an automobile comprising two separate plates of glass, a separate supporting device for each plate of glass connected with the top thereof at a point intermediate its front and rear edges, the glass being greater in width than the supporting device and projecting beyond the supporting device on both sides thereof, the two supporting devices being separately connected with the upper portion of the window frame, and substantially in alignment along the upper portion of said window frame said plates of glass being entirely supported by said supporting devices, each of the supporting devices having two hinges substantially at right angles to each other.

7. An air deflector for a side window of an automobile comprising two separate plates of glass, supports at the top thereof by which they are pivotally connected to the window frame, two friction pivots fixed with relation to each other and having their axes at an angle to each other so that the lower edges may be moved outwardly and the two glasses moved to different vertical angular positions, the glasses independently forming a rain shed for the window.

8. An air deflector for a side window of an automobile, comprising a plate of glass, a single supporting bracket connected with the glass intermediate its front and rear edges and adapted to be fastened to the window frame to support said glass in all of its various positions, said supporting bracket having two separate pivots both located intermediate the front and rear edges of the glass and substantially at right angles to each other united in a single supporting element whereby said glass may be moved about two separate axes.

9. An air deflector for a side window of an automobile, comprising a plate of glass, a supporting bracket connected with the edge of said glass and adapted to be fastened to the window frame, said supporting bracket having two pivots substantially at right angles to each other united in a single supporting element, said pivots having separate frictional means for resisting pivotal movement of the glass, whereby the lower edge of the glass can be moved outwardly and the entire glass may be moved to an angular position.

10. An air deflector for a side window of an automobile, comprising a main sliding window, a plate of glass on the outside of said sliding window, a supporting bracket connected with the edge of said glass and adapted to be attached to the window frame outside of the sliding window, said supporting bracket having two pivots substantially at right angles to each other, united in a single supporting element whereby the lower end of the glass may be moved outwardly away from the sliding window and also about a generally vertical axis to an angular position with relation to the sliding window.

11. An air deflector for a side window of an automobile, comprising a main sliding window, a plate of glass on the outside of said sliding window having two separated substantially horizontal edges, said plate of glass pivotally mounted in position so that it may be moved about a generally vertical axis intermediate its ends to angular positions with relation to the sliding glass window, and means for swinging one of the horizontal edges of said plate of glass bodily away from said sliding window for securing access to the outer face of said sliding window and the inner face of said plate of glass for cleaning purposes, while the plate of glass is being supported by the window frame.

12. An air deflector for a side window of an automobile, comprising a main sliding window, a plate of glass on the outside of said sliding window, a pivoted fastening device for pivotally fastening the plate of glass to the window frame outside of said sliding window so that it may be moved about a substantially vertical axis, and a pivotal connection between said plate of glass and the part of the fastening device attached to the window frame, whereby the opposite end of the plate of glass may be moved outwardly away from the sliding window so as to expose the outer face of the sliding window and the inner face of the plate of glass for cleaning purposes.

13. An air deflector for a side window of an automobile, comprising a main sliding window, a plate of glass on the outside of said sliding window, a pivoted fastening device for pivotally fastening the plate of glass to the window frame outside of said sliding window so that it may be moved about a substantially vertical axis, and a pivotal connection between said plate of glass and the part of the fastening device attached to the window frame, which permits the opposite end of the plate of glass to be moved outwardly away from the sliding window so as to expose the outer face of the sliding window and the inner face of the plate glass for cleaning purposes.

14. An air deflector for a side window of an automobile, comprising a main sliding window, a plate of glass on the outside of said sliding window, a pivoted fastening device for pivotally fastening the plate of glass to the window frame outside of said sliding window so that it may be moved about a substantially vertical axis, and a pivotal connection between said plate of glass and the part of the fastening device attached to the window frame, which permits the opposite end of the plate of glass to be moved outwardly away from the sliding window so as to expose the outer face of the sliding window and the inner face of the plate glass for cleaning purposes, the pivotal connection of the plate of glass of the window frame still acting to support said plate of glass when in its cleaning position.

15. An air deflector for a side window of an automobile, comprising a plate of glass mounted in position in the window opening, two pivotal connections between said glass and the window frame, said pivotal connections having their axes at an angle to each other, and means for holding said glass in any of the various positions into which it is moved by movement about either of said axes.

WILLARD L. MORRISON.